(12) United States Patent
Samworth

(10) Patent No.: US 6,445,465 B1
(45) Date of Patent: Sep. 3, 2002

(54) DIGITAL HALFTONING COMBINING DOT SIZE MODULATION SCREEN WITH DOT FREQUENCY MODULATION SCREEN WITHIN A SINGLE IMAGE

(75) Inventor: Mark R. Samworth, Wilmington, DE (US)

(73) Assignee: PCC Artwork Systems, Bristol, PA (US)

( * ) Notice: Subject to any disclaimer, the term of this patent is extended or adjusted under 35 U.S.C. 154(b) by 0 days.

(21) Appl. No.: 09/277,938

(22) Filed: Mar. 29, 1999

Related U.S. Application Data

(63) Continuation-in-part of application No. 08/942,795, filed on Oct. 2, 1997, now Pat. No. 5,892,588.

(51) Int. Cl.[7] .......................... G06K 15/02; H04N 1/405
(52) U.S. Cl. .......................... 358/1.9; 358/457; 358/459
(58) Field of Search .......................... 358/1.9, 459, 458, 358/457, 456, 298, 534–536

(56) References Cited

U.S. PATENT DOCUMENTS

| | | | |
|---|---|---|---|
| 5,625,755 A | 4/1997 | Shu | 358/1.9 |
| 5,694,224 A | 12/1997 | Tai | 358/455 |
| 5,726,722 A | 3/1998 | Parker et al. | 358/456 |
| 5,818,604 A | * 10/1998 | Delabastita et al. | 358/298 |

* cited by examiner

Primary Examiner—Scott Rogers
(74) Attorney, Agent, or Firm—Ratner & Prestia

(57) ABSTRACT

A method of producing a halftone screen having a plurality of halftone dots arrayed along a desired screen frequency. The method comprises: a) using variable size halftone dots arrayed along the screen frequency to reproduce shades of gray equal to and above a predetermined shade of gray, the predetermined shade of gray having a first halftone dot size; and b) reproducing shades of gray below the predetermined shade of gray using the first halftone dot size arrayed along the screen frequency by deleting a number of halftone dots per unit area to obtain gray shades below the predetermined shade of gray.

6 Claims, 11 Drawing Sheets

| 96 | 88 | 80 | 72 | 64 | 68 | 76 | 84 | 92 | 98 |
| 90 | 60 | 52 | 44 | 40 | 36 | 48 | 56 | 63 | 94 |
| 82 | 59 | 32 | 25 | 17 | 20 | 29 | 34 | 55 | 86 |
| 74 | 51 | 27 | 15 | 9 | 4 | 13 | 31 | 47 | 78 |
| 66 | 42 | 23 | 7 | 1 | 0 | 11 | 18 | 38 | 71 |
| 70 | 46 | 19 | 10 | 3 | 2 | 6 | 22 | 43 | 67 |
| 79 | 54 | 30 | 12 | 5 | 8 | 14 | 26 | 50 | 75 |
| 87 | 99 | 35 | 28 | 21 | 16 | 24 | 33 | 58 | 83 |
| 95 | 62 | 57 | 49 | 37 | 41 | 45 | 53 | 61 | 91 |
| 99 | 93 | 85 | 77 | 69 | 65 | 73 | 81 | 89 | 97 |

| 98 | 92 | 84 | 76 | 68 | 64 | 72 | 80 | 88 | 96 |
|----|----|----|----|----|----|----|----|----|----|
| 94 | 63 | 56 | 48 | 36 | 40 | 44 | 52 | 60 | 90 |
| 86 | 55 | 34 | 29 | 20 | 17 | 25 | 32 | 59 | 82 |
| 78 | 47 | 31 | 13 | 4  | 9  | 15 | 27 | 51 | 74 |
| 71 | 38 | 18 | 11 | 0  | 1  | 7  | 23 | 42 | 66 |
| 67 | 43 | 22 | 6  | 2  | 3  | 10 | 19 | 46 | 70 |
| 75 | 50 | 26 | 14 | 8  | 5  | 12 | 30 | 54 | 79 |
| 83 | 58 | 33 | 24 | 16 | 21 | 28 | 35 | 99 | 87 |
| 91 | 61 | 53 | 45 | 41 | 37 | 49 | 57 | 62 | 95 |
| 97 | 89 | 81 | 73 | 65 | 69 | 77 | 85 | 93 | 99 |

FIG. 12

| 98 | 92 | 84 | 76 | 68 | 64 | 72 | 80 | 88 | 96 |
|---|---|---|---|---|---|---|---|---|---|
| 94 | 63 | 56 | 48 | 36 | 40 | 44 | 52 | 60 | 90 |
| 86 | 55 | 34 | 29 | 20 | 17 | 25 | 32 | 59 | 82 |
| 78 | 47 | 31 | 13 | 9 | 9 | 15 | 27 | 51 | 74 |
| 71 | 38 | 18 | 11 | 9 | 9 | 9 | 23 | 42 | 66 |
| 67 | 43 | 22 | 9 | 9 | 9 | 10 | 19 | 46 | 70 |
| 75 | 50 | 26 | 14 | 9 | 9 | 12 | 30 | 54 | 79 |
| 83 | 58 | 33 | 24 | 16 | 21 | 28 | 35 | 99 | 87 |
| 91 | 61 | 53 | 45 | 41 | 37 | 49 | 57 | 62 | 95 |
| 97 | 89 | 81 | 73 | 65 | 69 | 77 | 85 | 93 | 99 |

FIG. 13

DIGITAL HALFTONING COMBINING DOT SIZE MODULATION SCREEN WITH DOT FREQUENCY MODULATION SCREEN WITHIN A SINGLE IMAGE

CROSS REFERENCE TO RELATED APPLICATIONS

This application is a continuation-in-part application of U.S. patent application Ser. No. 08/942,795, issued Oct. 2, 1997 on an application number 5,892,588, issued Apr. 6, 1999 on an application filed Oct. 2, 1997, the contents of which are incorporated herein by reference.

BACKGROUND OF THE INVENTION

The present invention is directed to the field of digital image processing to produce half-tone image data for driving a printing machine, such as an image setter which images films or plates to be printed on a flexo-press (a flexographic press), and is also directed to the use of halftone image screens to produce enhanced image data from the data provided from digital sources including desktop publishing outputs, scanner outputs and digital camera outputs.

Digital halftoning is a computer graphics technique for producing an image, with many gray levels, on a binary imaging device in which the gray levels are approximated by black and white dots. The image presentation (character, shape, and shading) is achieved by changing percentage of area coverage (dot intensity) from region to region (pixel region to pixel region). Dot intensity is altered by altering dot size (amplitude—cluster dot pattern screening) or by altering dot density (frequency—dispersed dot pattern screening).

In digital halftoning systems and methods, dispersed patterns are created by error diffusion techniques (stochastic generators) which provide a randomized grain effect pattern. The size of the halftone dot, whose shape can vary from screen format to screen format, is fixed for a given screen. Lighter and darker (gray) values are created by varying the population density of the dots. Cluster dot patterns are generated by selecting a distance between halftone dots for particular screen. Different gray values are achieved by varying the size of the dots. Conventional screen sets have been available with dot sizes that permit typically between 50 and 200 dots per inch.

Regardless of screen pattern selected, as pattern intensity is increased (percentage of area covered), image darkness and thereby resolution changes. With digital formats and digital implementation, an increase in gray value (number) results in an increased percent coverage.

In higher gray scale regions (darker) of an image generated, the cluster dot pattern screens have provided better visual acceptance of the imaging. In lower gray scale regions (lighter) of an image, the dispersed dot pattern screens have provided better visual acceptance of the imaging. It would therefore be logical to combine these two screens. However, when these two dot pattern screens have been combined to generate a single image, the transition between screen types has created an optically undesirable transition effect.

Moreover, in many reproduction processes, imaging dots below a specific size are not possible or problematic to generate and process. Therefore, reproducing gray levels in light tones is not possible or problematic, in such systems.

Flexographic press printing (relief printing with flexible rubber-like plates fastened to a cylinder) is a process in which the ability to achieve smaller imaged dot sizes has been limited. Typically, dot sizes have been limited to 40 microns or greater. Therefore, the definition quality of the printed image has been noticeably degraded in lighter areas.

What is desired is an improved digital imaging technique which provides enhanced digital imaging over the entire range of gray scale values, and specifically in low gray scale values.

What is also desired is an algorithm for implementing the digital technique which can enhance the image produced in lower gray levels (lighter areas of the image) when the smallest dot size available is not small enough to provide good images at those lower gray levels.

What is further desired is an apparatus to provide such enhanced digital imaging and for the implementation of the algorithm.

SUMMARY OF THE INVENTION

The invention provides a method of producing a halftone screen having a plurality of halftone dots arrayed along a desired screen frequency. The method comprises:

a) using variable size halftone dots arrayed along the screen frequency to reproduce shades of gray equal to and above a predetermined shade of gray, the predetermined shade of gray having a first halftone dot size; and b) reproducing shades of gray below the predetermined shade of gray using the first halftone dot size arrayed along the screen frequency by deleting a number of halftone dots per unit area to obtain gray shades below the predetermined shade of gray.

The invention also provides a method for combining a halftone screen having a plurality of halftone dots of different size arrayed along a desired screen frequency with a halftone screen having a plurality of fixed size halftone dots arrayed at a random pattern without a visually objectionable transition area for reproducing shades of gray that are difficult to reproduce with either screen alone. The method comprises:

a) determining a minimum halftone dot size; and b) reproducing a shade of gray requiring halftone dots smaller than the minimum dot size, by using a reduced number of the minimum size dots arrayed along the screen frequency.

Furthermore, the invention provides a method of manufacturing a halftone screen comprising:

a) selecting a minimum halftone dot size;

b) identifying a desired shade of gray requiring a halftone dot size smaller than the minimum halftone dot size for the screen;

c) calculating a number of halftone dots of the minimum size required to reproduce the desired shade of gray for the screen; and d) replacing the smaller size halftone dots required to reproduce the shade of gray with the calculated number of minimum size halftone dots.

DESCRIPTION OF THE DRAWINGS

The features, advantages and operation of the present invention will become readily apparent and further understood from a reading of the following detailed description with the accompanying drawings, in which like numerals refer to like elements, and in which:

FIG. 12 shows a 50% dot size threshold array; and

FIG. 13 shows a minimum array for a user selected minimum size of 10%.

DETAILED DESCRIPTION OF THE INVENTION

The present invention is a method of digital imaging by gray tone to halftone generation and thereafter by halftone processing which produces an enhanced digitally generated image output when the system hardware parameters have dot size limits above the definition desired in the image. The method and apparatus operate principally upon AM screening dots (size modulated dot pattern) and then frequency modulates the dot pattern to varying degrees of random deletion to generate resultant effects of size modulated dot pattern below the dot size limitations of the system hardware.

Figure 1:
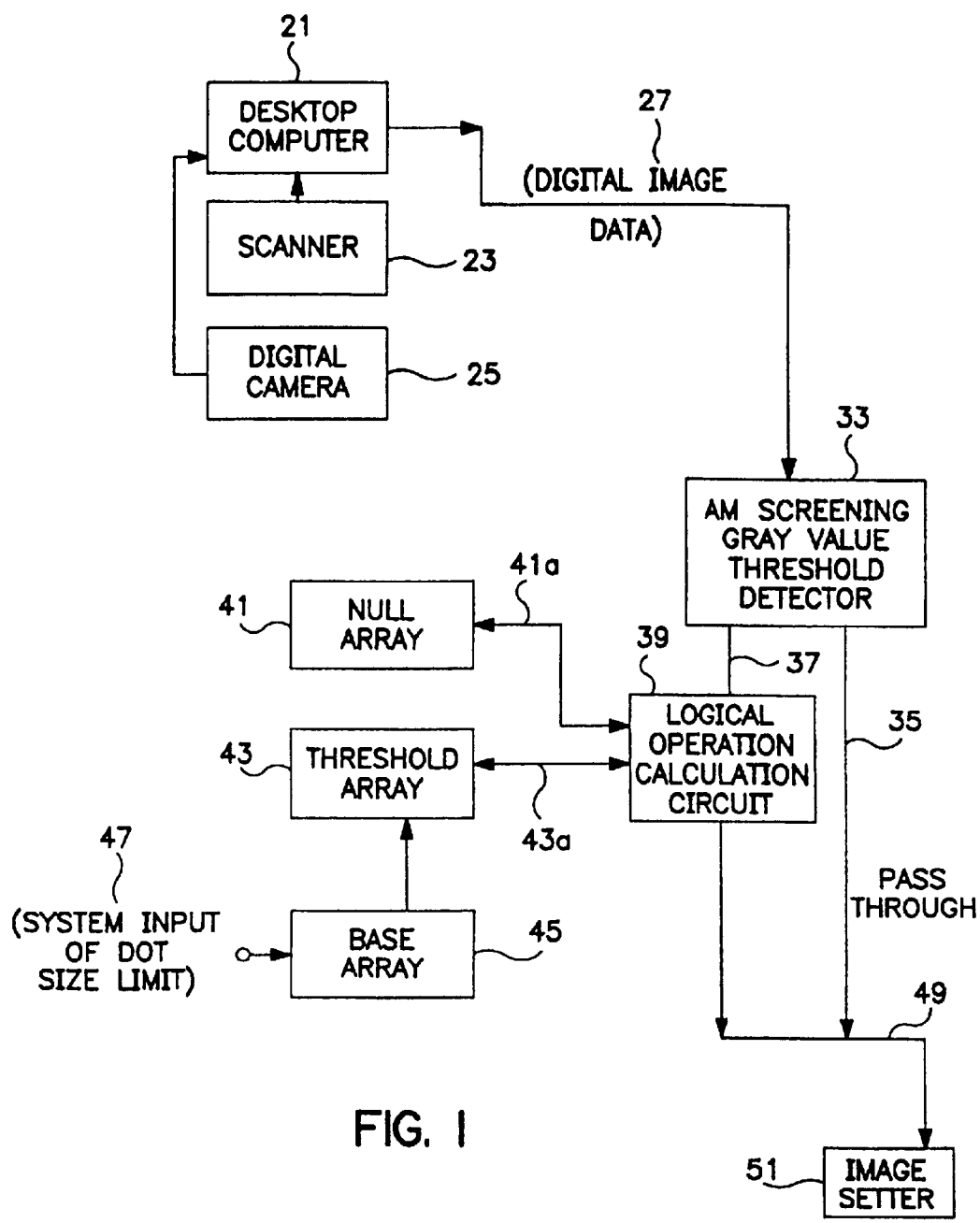
FIG. 1 shows a block diagram of the circuitry for implementing the present invention.

Digital continuous tone image data is generated from any of a plurality of devices, FIG. 1, such as graphics from a desktop computer 21, images from a scanner 23 and images, from a digital camera 25. The output from the scanner 23 and the output from the digital camera 25 are fed into the computer 21 which supplies the image data to the halftoning portion of the invention. The digital image data, 27 is connected to be sent to an AM screening gray value threshold detector 33. In the AM screening gray value threshold detector 33, dot area modulation screening is conducted. The halftone image/data which has a value above the selected gray value, e.g. 10, is passed through a pass through 35 without further processing. The halftone image data which has a value below gray value 10 is sent 37 to a logical operation calculation circuit 39. In the logical operation calculation circuit 39, dot frequency modulation is applied to the dot area modulated halftone data received from the AM screening gray value threshold detector 33.

The threshold value (e.g. 10) is chosen at a percentage of the possible dot size pattern dictated by system minimum dot size. Typically, if minimum dot size is 40 microns on the plate (4% at 150 lines per inch dot size modulation screen) then this threshold is set at gray value 47 input from the system parameters.

The output from the logical operation calculation circuit 39 is joined with the pass through 35 output from the AM screening gray value threshold detector circuit 33 to form composite image data 49, which is sent to the image setter 51 of a flexographic press printing system.

Figure 2:
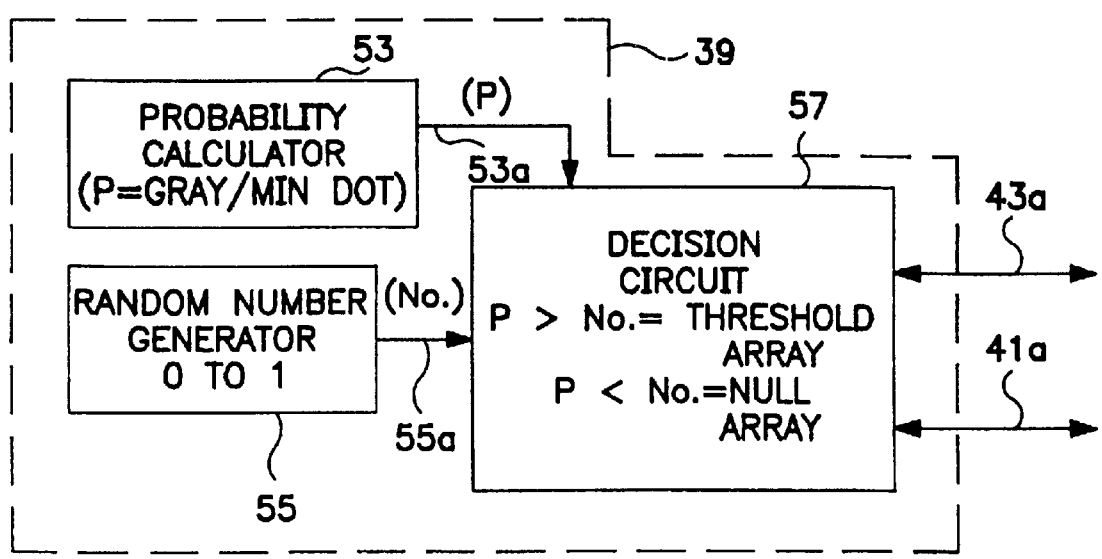
FIG. 2 shows a block diagram of the circuitry for implementing the logical operation calculation circuit of FIG. 1.

The circuitry, FIG. 2, implemented within the logical operation calculation circuit 39, includes a probability calculator 53 which calculates a probability value 53a as gray value divided by minimum dot size; a random number generator 55 which generates number values 55a from 0 to 1; a decision circuit 57 which receives both the probability value 53 and the number 55a. If the probability value 53a is greater than the random number 55a, the threshold array 43 is read via the decision line 43a. If the probability value 53a is less than the number 55a, the null array 41 is read via the decision line 41a.

Figure 3:
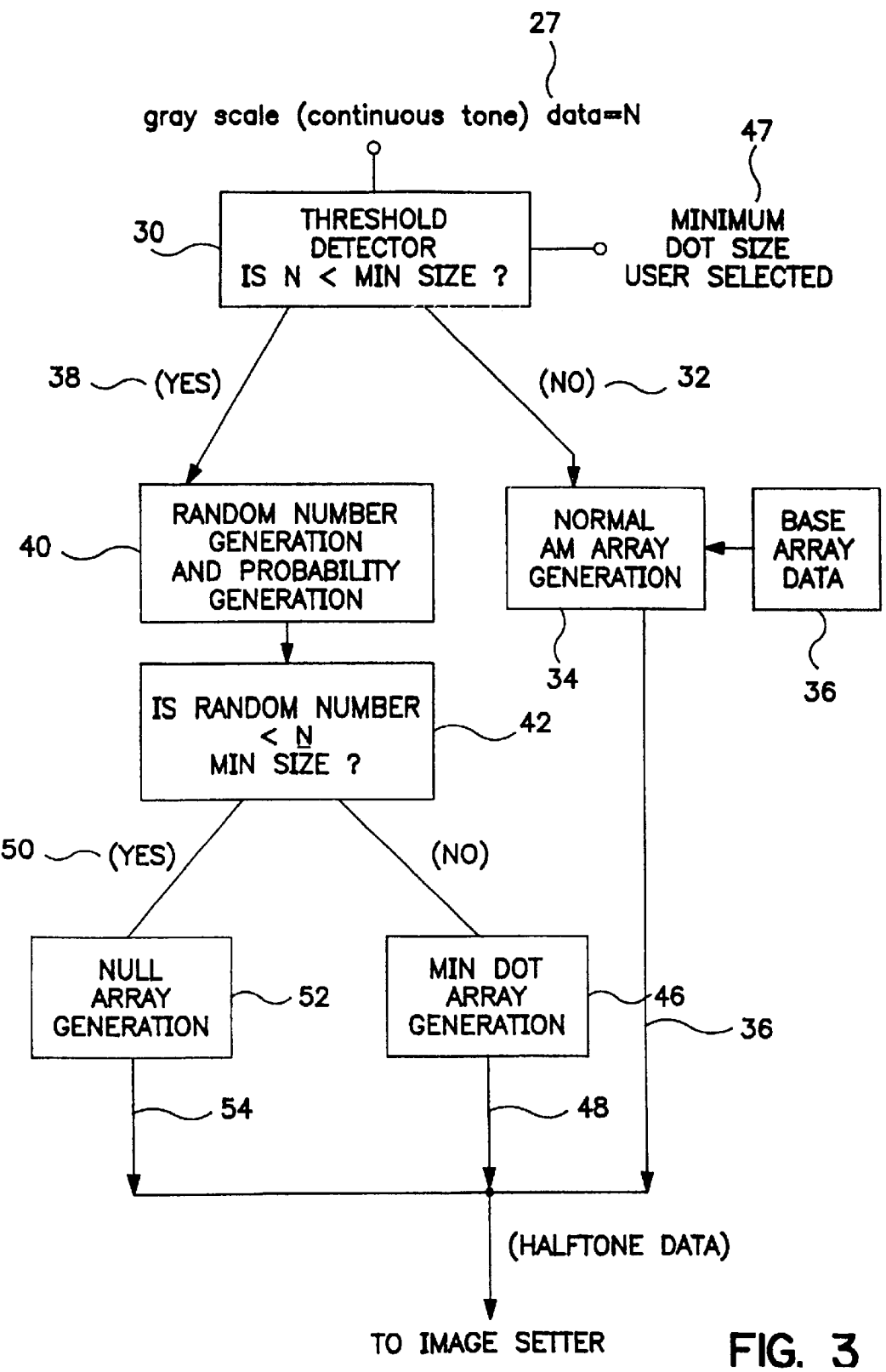
FIG. 3 shows the logic step operations carried on by the circuitry of FIG. 1.

The process steps carried out with the AM screening gray value threshold detector circuit 33, the logical operation calculation circuit 39 and the arrays 41, 43, 45 are shown in FIG. 3. The continuous tone (gray scale) image data 27 is designated as "N" in the logical operations and is obtained from the digital source. A minimum dot size 47 is designated in the logical steps as "MIN". It is the dot size necessary to do successful AM screening (dot size modulation). The value is empirically selected by the user base on equipment performance, after an engineering recommendation based on known equipment parameters.

The threshold detector operation determines if "N" is less than "MIN" step 30, FIG. 3. If no, 32, then the gray scale data is half-toned using a normal AM array which is generated 34 after obtaining the base array data 36. The output from the normal dot size modulation step 34 is sent 36 o the image setter with other composite data for the image.

If "N" is greater than "MIN" yes 38, then a random number from 0 to 1 is generated. This random number is kept in this range because the other calculation figures are in that range. Also, a "probability" value is generated. The "probability" is equal to the gray value divided by "MIN". These operations are designated as random number generation and probability step 40.

Following this step 40, a determination is made if the random number is less than the "probability" ("N" divided by "MIN"), step 42. If no 44, then a "MIN" dot array is generated 46 and the data is operated upon using this "MIN" dot array, and then passed 48 onto the image setter as part of the composite halftoned image data.

If the random number is less than the "probability" yes 50, then a null array is generated and the data is operated upon using the null array, step 52. The output from this step 52 is passed 54 on to the image setter as part of the composite halftoned image data. The output 54 is a nullity and determines the random deleted spaces.

Figure 3A:
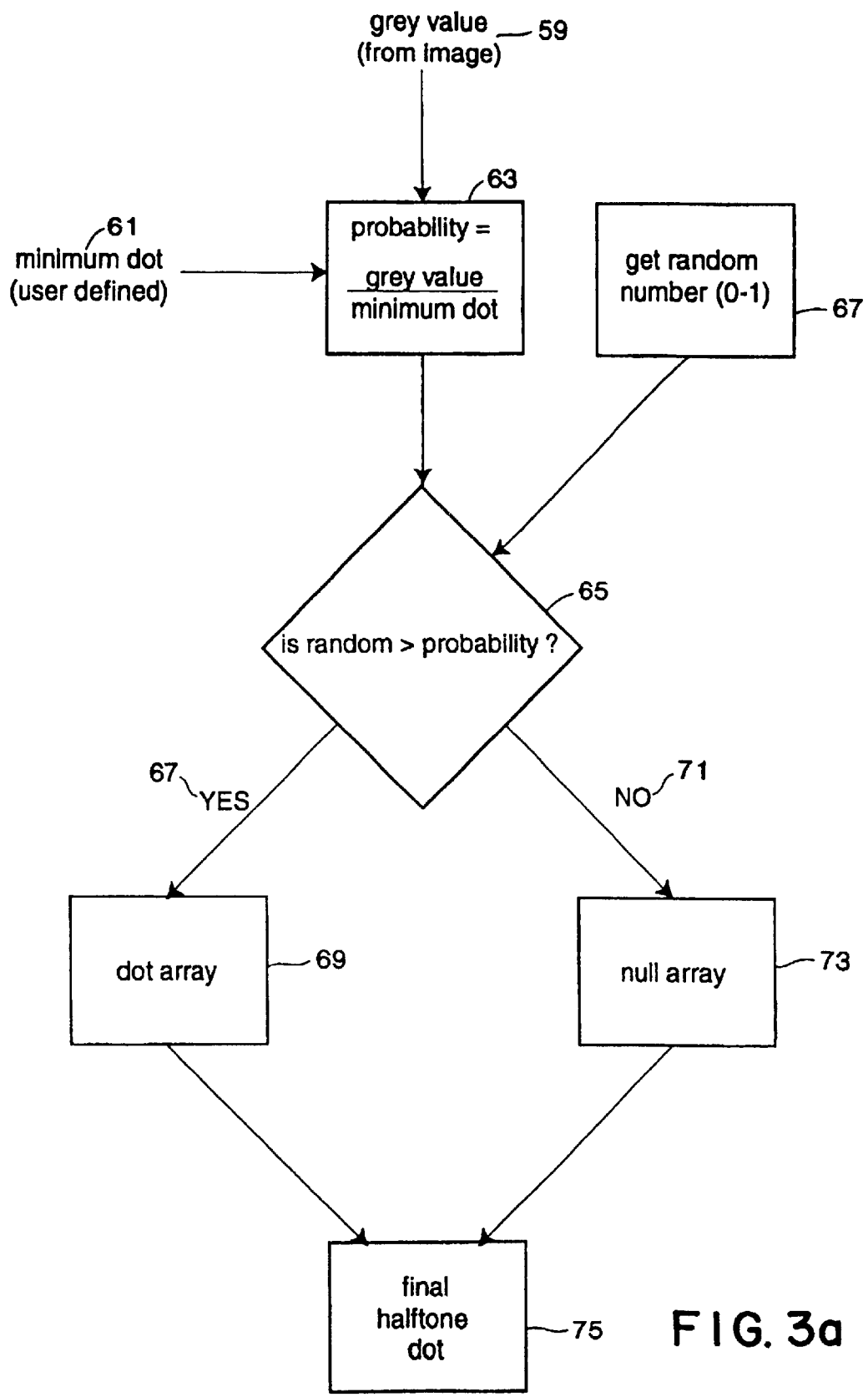
FIG. 3a shows the step operations carried on by the logical operation calculation circuit of FIG. 2 and is a detail of the random number and probability generation steps of FIG. 3.

The method steps carried out in steps 40, 42, 46 and 52 is shown in greater detail in FIG. 3a. Gray values are obtained, step 59, from the image data received The minimum dot size information 61, which is user defined, is also obtained 47 (shown in FIG. 3). The probability value is calculated 63 and then fed to a decision step 65 which determines if that probability value is greater than a random number generated 67. If it is larger yes 67, the threshold dot array is read 69. If it is not larger yes 71, the null array is read 73. The reading of the dot array 69 or the null array 73 determines the final halftone dot characterization 75.

Figure 4:
FIG. 4 shows a dot size modulation (AM-screening) pattern for gray scale values from 1 to 100.
Figure 5:
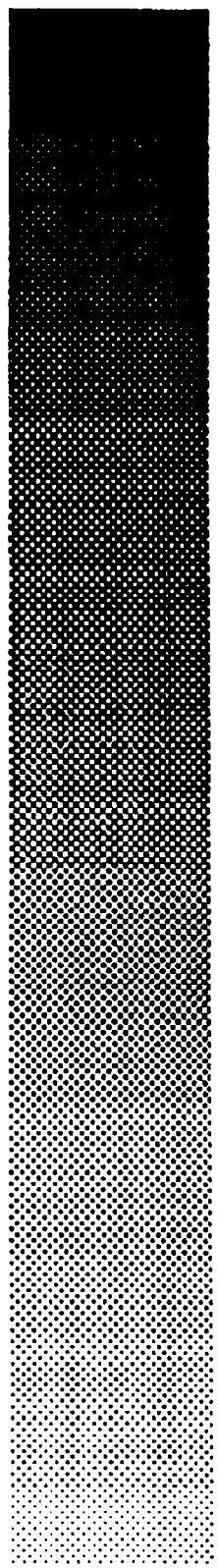
FIG. 5 shows a dot density (frequency) modulation (FM screening) pattern for gray scale values from 1 to 100.
Figure 6:
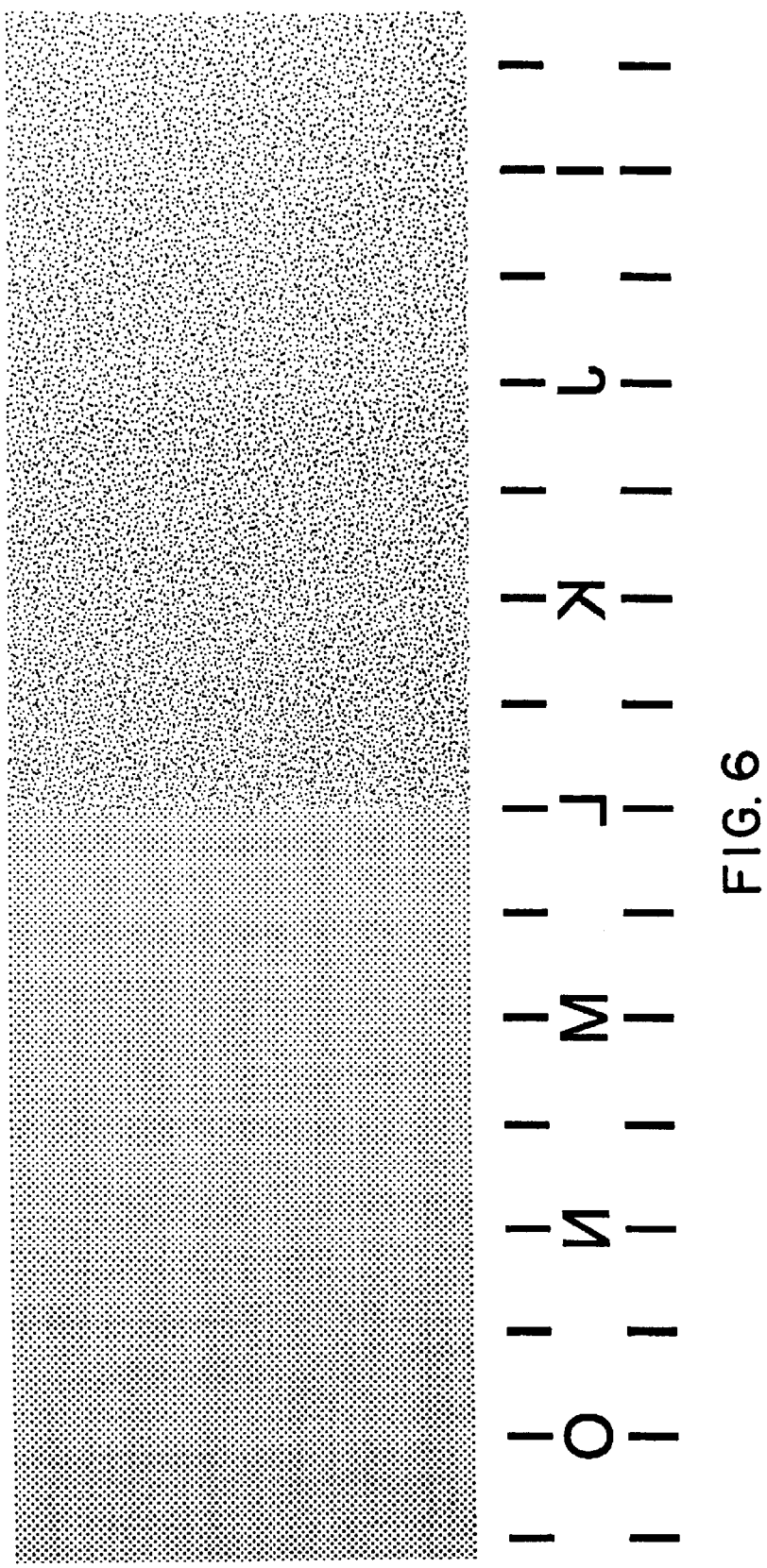
FIG. 6 shows the readily observable transition encountered when imaging is implemented with halftoning of FM screening and AM screening.
Figure 7:
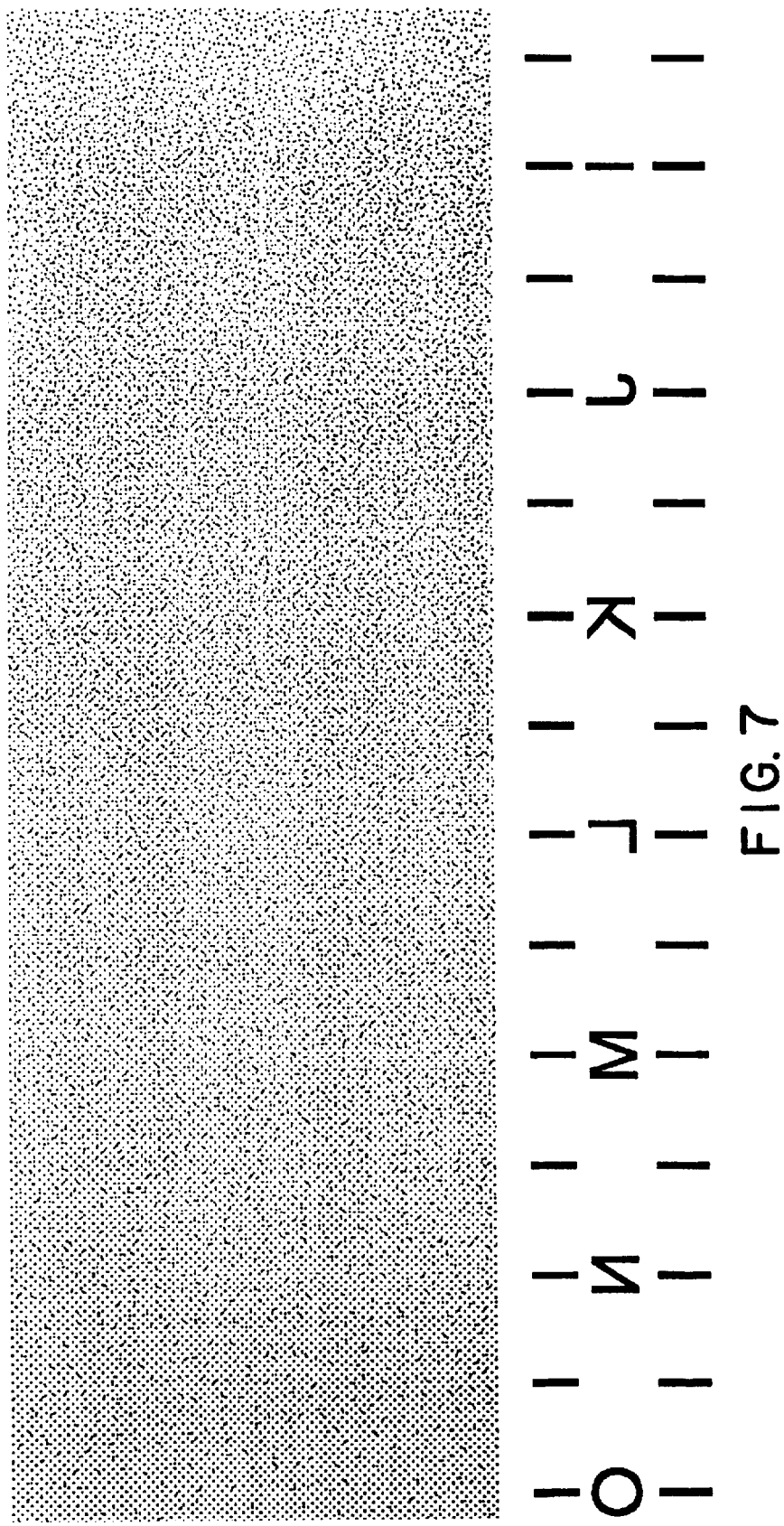
FIG. 7 shows a minimizing of the observable transition by gradual merging of AM and FM screening over a zone region where minimum dot size is of a significant value (e.g. 3% or higher)

The present invention does not use a dot size modulation screening pattern, FIG. 4, in its raw form for gray values from 1 to 100. Nor does it use a dot frequency modulation screening pattern, FIG. 5, in its raw form for gray values from 1 to 100. Mixing these two patterns would create the composite hard threshold pattern, FIG. 6, or the gradual threshold pattern, FIG. 7. However, the gradual threshold pattern of FIG. 7 is not possible in flexographic printing systems where the smallness of the dot size is limited as being not possible or problematic.

In such flexographic systems, where dot size is limited to 40 microns (e.g. 4%), there is no ability for the equipment to normally reproduce a gray value of less than 4% (i.e., 1 to 4 on a scale of 1 to 100).

Figure 8:
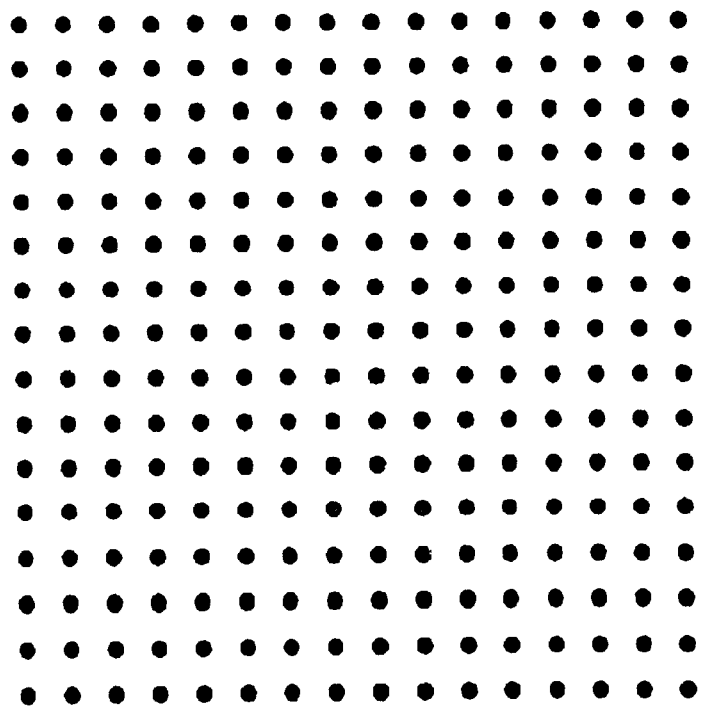
FIG. 8 shows an enlargement of a pattern of minimum size dot of 10%.
Figure 9:
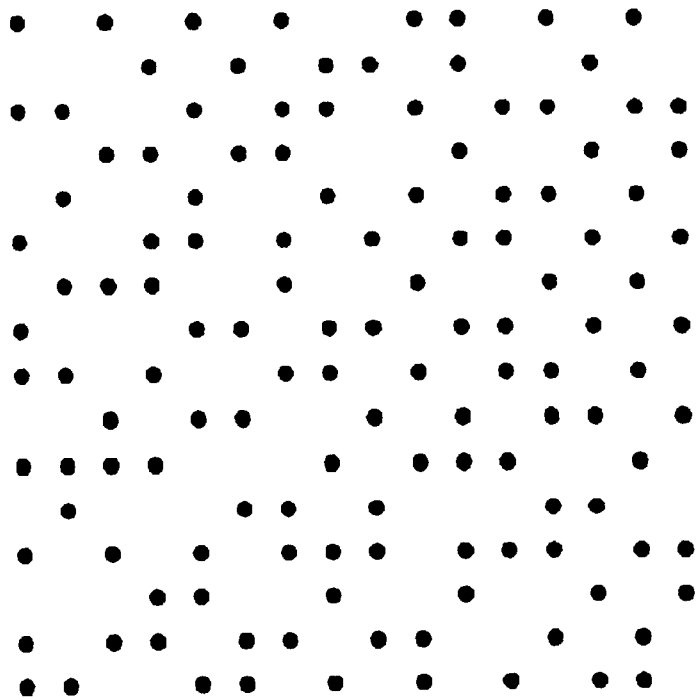
FIG. 9 shows the dot pattern of FIG. 8 with 50% of the dots randomly deleted, thereby yielding a resultant effect of a 5% dot size pattern.

However, the present invention can operate in a system which has a dot size limit of for example 10%, FIG. 8, and produce gray levels below this point by randomly deleting a percentage of the population of the dots, such that the visual result is the same as that obtained in a smaller dot. If the 10% dot pattern, FIG 8., is reduced by 50%, a 5% dot pattern, FIG. 9, results.

Moreover, because the dot frequency modulation effect of this invention is created from the dot area modulation screen, the transition from dot area modulation to dot frequency modulation occurs gradually over the range of gray values. For example a 9% dot density is created by deleting 10% of the 10% dots; an 8% dot is created by deleting 20% of the 10% dots.

Figures 10, 11:
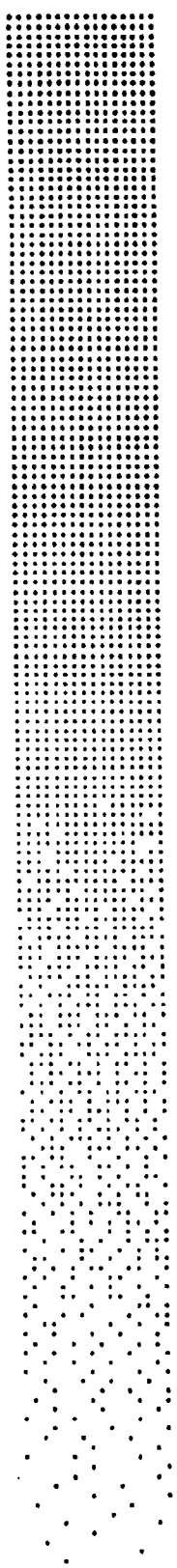
FIG. 10 shows the-dot pattern generated for gray scale values of 10 to 100 with the method and apparatus of the present invention.
FIG. 11 shows a base array.

The resultant screen pattern, FIG. 10, has a transition from dot size modulation to dot density modulation which is not visually objectionable.

In a normal screening process, a gray value is converted to a dot through an AM array generation from the base array shown in FIG. 11. This array, FIG. 11, shows the values for a 10 by 10 array. The values in each block of the array signify a percentage of coverage for that pixel, i.e., dot density from 0% to 99%. A gray level input to the array, FIG. 11, produces a dot with all values in the array below a threshold value set to 1 and all values above the threshold set to 0. As such, each gray level produces a different dot shape.

A 50% dot contains all the values below 50 set to 1, FIG. 12, shaded region. This FIG. 12 illustrates a 50% dot threshold array. The shaded portion defines the threshold array 43, FIG. 1, values for these parameters (i.e., 50% dot). When the minimum dot value (dot size limit) is set to 10%, the threshold array 43, FIG. 1, looks like the shaded portion of the base array shown in FIG. 13.

The array shown in FIG. 13 is the "MIN" array generated in the minimum dot array generation step 46 of FIG. 3 and is the dot array 69 step shown in FIG. 3a for the 10% dot size limit. The blocks in the shaded region all show a number less than the threshold number i.e., the "probability" equaling "N" divided by "MIN". These blocks in the shaded region are then set equal to the threshold number.

Many changes can be made in the above-described invention without departing from the intent and scope thereof. It is thereby intended that the above description be read in the illustrative sense and not in the limiting sense.

I claim:

1. A method of producing a halftone screen having a plurality of halftone dots arrayed along a desired screen frequency, the method comprising:

a) using variable size halftone dots arrayed along said screen frequency to reproduce shades of gray equal to and above a predetermined shade of gray, said predetermined shade of gray having a first halftone dot size; and b) reproducing shades of gray below said predetermined shade of gray using said first halftone dot size arrayed along said screen frequency by deleting a number of halftone dots per unit area to obtain gray shades below said predetermined shade of gray.

2. A method for combining a halftone screen having a plurality of halftone dots of different size arrayed along a desired screen frequency with a halftone screen having a plurality of fixed size halftone dots arrayed at a random pattern without a visually objectionable transition area for reproducing shades of gray that are difficult to reproduce with either screen alone, the method comprising:

a) determining a minimum halftone dot size; and b) reproducing a shade of gray requiring halftone dots smaller than the minimum dot size, by using a reduced number of said minimum size dots arrayed along the screen frequency.

3. A method of manufacturing a halftone screen comprising:

a) selecting a minimum halftone dot size;

b) identifying a desired shade of gray requiring a halftone dot size smaller than the minimum halftone dot size for said screen;

c) calculating a number of halftone dots of said minimum size required to reproduce said desired shade of gray for said screen; and d) replacing the smaller size halftone dots required to reproduce the shade of gray with the calculated number of minimum size halftone dots.

4. A method for producing a halftone screened image comprising gray shades of lesser value than gray shades reproduced by a smallest dot size possible by a selected printing plate, the method comprising combining in said screened image (a) dot size modulation screening for shades of gray equal to and above a predetermined shade of gray and (b) dot frequency modulation screening for shades of gray less than said predetermined shade of gray, wherein said predetermined shade of gray comprises a first dot size and wherein said frequency modulation screening is implemented with halftone dots of said first dot size.

5. The method according to claim 4 wherein said method is implemented using a computer.

6. The method according to claim 5 wherein the method further comprises implementing said frequency modulation screening by reducing the number of halftone dots per unit area.

* * * * *